(12) United States Patent
Luo et al.

(10) Patent No.: US 7,767,611 B2
(45) Date of Patent: Aug. 3, 2010

(54) MODIFIED ZEOLITE BETA

(75) Inventors: Yibin Luo, Beijing (CN); Zhijian Da, Beijing (CN); Ying Ouyang, Beijing (CN); Li Zhuang, Beijing (CN); Jun Long, Beijing (CN); Xingtian Shu, Beijing (CN); Baoning Zong, Beijing (CN)

(73) Assignees: China Petroleum & Chemical Corporation, Beijing (CN); Research Institute of Petroleum Processing Sinopec, Beijing (CN)

( * ) Notice: Subject to any disclaimer, the term of this patent is extended or adjusted under 35 U.S.C. 154(b) by 124 days.

(21) Appl. No.: 11/915,765

(22) PCT Filed: May 31, 2006

(86) PCT No.: PCT/CN2006/001164

§ 371 (c)(1),
(2), (4) Date: Apr. 4, 2008

(87) PCT Pub. No.: WO2006/128374

PCT Pub. Date: Dec. 7, 2006

(65) Prior Publication Data

US 2008/0261803 A1    Oct. 23, 2008

(30) Foreign Application Priority Data

May 31, 2005    (CN)    .......................... 2005 1 0073093

(51) Int. Cl.
*B01J 29/06* (2006.01)
*B01J 29/072* (2006.01)

(52) U.S. Cl. .............................. 502/60; 502/74; 585/653
(58) Field of Classification Search .................. 502/60, 502/74; 585/653
See application file for complete search history.

(56) References Cited

U.S. PATENT DOCUMENTS 3,308,069 A    3/1967    Wadlinger et al.
4,605,637 A    8/1986    Chang et al.
5,290,932 A    3/1994    Dingerdissen et al.
5,453,553 A    9/1995    Sivasanker et al.
5,535,817 A    7/1996    Dunne
5,833,840 A    11/1998   Absil et al.
6,787,123 B2   9/2004    Du et al.
6,991,774 B2   1/2006    Du et al.
2003/0064881 A1   4/2003   Du et al.
2007/0293714 A1 *  12/2007  Long et al. ................... 585/899

FOREIGN PATENT DOCUMENTS

| CN | 1043450 A | 7/1990 |
| CN | 1057408 A | 1/1992 |
| CN | 1098028 A | 2/1995 |
| CN | 1179994 A | 4/1998 |
| CN | 1205249 A | 1/1999 |
| CN | 1473652 A | 2/2004 |
| CN | 1616351 A | 5/2005 |
| WO | WO2006128374 | * 7/2006 |

OTHER PUBLICATIONS

Qiu Yiqi; "A Method Using X-ray Fluoroscopy to Measure the Content of Mo, Ni, Co and P in catalyst—Dilute Method"; RIPP 133-90, pp. 376-379. (English translation attached).

Gu Ruojing; "A Method Using X-ray Fluoroscopy to Analyze the Content of SiO2, Al2O3, Fe2O3 and Light Rare Earth Oxide in FCC Catalyst"; RIPP 134-90, pp. 380-383. (English translation attached).

* cited by examiner

*Primary Examiner*—David M Brunsman
(74) *Attorney, Agent, or Firm*—Dickstein, Shapiro, LLP.

(57) ABSTRACT

A modified zeolite beta having an anhydrous chemical formula, by weight % of the oxides, of $(0-0.3)Na_2O \cdot (0.5-10)Al_2O_3 \cdot (1.3-10)P_2O_5 \cdot (0.7-15)M_xO_y \cdot (70-97)SiO_2$, wherein M is one or more transition metal(s) selected from the group consisting of Fe, Co, Ni, Cu, Mn, Zn and Sn, x is the number of the atoms of said transition metal M, and y is a number that meets with the requirement of the oxidation state of said transition metal M, is disclosed. The modified zeolite beta can be used as an active component of a cracking catalyst or additive for catalytic cracking of petroleum hydrocarbons.

10 Claims, No Drawings

MODIFIED ZEOLITE BETA

This application is a 371 filing of PCT/CN2006/001164, filed May 31, 2006.

TECHNICAL FIELD

The present invention relates to a modified zeolite beta and use thereof, specifically, to a zeolite beta modified with phosphorus and transition metal(s) and use thereof in petroleum hydrocarbon processing.

BACKGROUND ART

In 1967, using sodium aluminate, silica gel, tetraethyl ammonium hydroxide (TEAOH) and water, Wadlinger of Mobile Corp first synthesized a zeolite beta through mixing-crystallization. The zeolite beta is characterized by a high silica-alumina ratio, which can vary in a wide range. Martens et, al. proclaimed that, by using decane as a probe, the zeolite beta had a porous framework structure of 12-member ring; in 1988, Newsam and Higgins et. al. determined for the first time that the zeolite beta had a stacking fault structure by framing model and simulating powder diffractometry. The zeolite beta has a 12 member-ring structure with intersected porous channels, wherein the pore diameter of the 12-member ring is 075-0.57 nm for one-dimension porous channel parallel to the (001) crystal face, while the pore diameter of the 12 member-ring is 0.65-0.56 nm for the two-dimension porous channel parallel to the (100) crystal face. The zeolite beta is a high silica zeolite with macropores and a three-dimension structure that is only one discovered up to now, and has both acid catalytic property and structural selectivity due to its structural particularity, and further has very high thermostability (the failure temperature of the crystal lattice is higher than 1200° C.), hydrothermal stability and wear-resistant property. Due to the unique structural feature, the zeolite beta has good thermal and hydrothermal stability, acid resistance, anti-coking property and catalytic activity in a series of catalytic reactions, showing excellent performance in aspects of catalysis, adsorption and the like, therefore it has broad prospects in applications and has been developed rapidly into a new-type of catalytic materials in recent years. After modified or supported with some metal components, the zeolite beta can be used for petroleum refining and petrochemical processes such as hydrocracking, hydroisomerization, hydration of olefins, and the like.

In many catalytic chemical reaction processes, there is need to use the zeolite supported or exchanged with metals or metal ions (such as Ni, Co, Cu, Ag, Zn, Fe, Mn, Cr, Zr, Mo, W, alkali earth metal, rare earth metal and the like) as an active component of catalyst.

CN 1098028A discloses a zeolite beta catalyst for reactions of toluene dispropotion and transalkylation, the catalyst consists of 10-90 wt % of zeolite beta, 5-90 wt % of a binder and 0.05-5 wt % of metals selected from the group consisting of Ni, Co, Cu, Ag, Sn, Ga and the like, wherein the metals are supported by means of immersion.

U.S. Pat. No. 5,453,553 discloses a process for preparing dodecylbenzene through the reaction of benzene and laurylene, wherein the catalyst used is obtained by supporting one or more transition metals selected from Fe, Ni, Co, Pt and Ir on a zeolite selected from X-, Y-, M-, ZSM-12 or zeolite betas. These metals are supported in pores of the zeolite by impregnating, the catalysts can obviously improve the stability of the catalyst used in synthesis of dodecylbenzene, however, the object for increasing activity stability can be achieved only when the reaction is carried out under hydrogen atmosphere.

The main obstacles encountered during use of the zeolite beta are that, on the one hand, the structure is easy to be injured during removal of the template agent and, on the other hand, its activity stability is poor due to ease of dealuminization in the reaction process.

U.S. Pat. No. 4,605,637 proposes a process for treating a zeolite of lower acidity, for example, B-containing ZSM-5, B-containing zeolite beta, high silicon ZSM-5 zeolite and the like with aluminum phosphate material such as microcrystal $AlPO_4$-5 and the like in a liquid aqueous system to migrate Al atoms into the framework of the zeolite, to increase the acidity and the pyrolysis activity of the zeolite.

CN 1043450A proposes a process for modifying zeolite beta, the process comprises calcining Na zeolite beta, extracting aluminum from part of its framework with an acid, then potassium-exchanging the resultant zeolite so that the potassium content of the zeolite will be 0.5-2.5 wt %, drying and calcining, an immersing at room temperature in a near neutral buffer solution of phosphorus salt including, such as, potassium hydrogen phosphate-potassium dihydrogen phosphate, hypophosphorous acid-potassium hypophosphite, phosphorous acid-potassium phosphite, for 4-10 hrs, with or without washing as needed, so that the phosphorus content of the zeolite will be 0.01-0.5 wt %, then drying and calcining; by this method the modified zeolite beta is suited as a hydrocarbon processing catalyst for hydroisomerization reaction.

CN 1179994A proposes a process for modifying zeolite beta, the process comprises exchanging a Na-zeolite beta with ammonium ion to a $Na_2O$ content of the zeolite of less than 0.1 wt %; then treating said ammonium ion exchanged zeolite beta with an acid to extract aluminum atoms from part of its framework to increase the silica-alumina ratio to higher than 50; mixing homogeneously thus dealuminized zeolite beta with phosphoric acid or a phosphate, then oven-drying the resultant mixture to make the obtained zeolite having 2-5 wt % of $P_2O_5$ content; finally hydrothermal-calcining the obtained zeolite at 450-650° C. under a steam atmosphere for 0.5-4 hrs. When the zeolite beta modified by this process is used for cracking reaction of hydrocarbons, higher yield of olefins can be obtained, in particular higher yield of isomeric olefins and lower yield of coke.

CN 1205249A proposes a process for modifying zeolite beta, the process comprises mixing homogeneously the raw powder of a synthesized zeolite beta with a mixture containing $Al_2O_3$ source, $P_2O_5$ source, $SiO_2$ source, $H_2O_2$ and water in a weight-ratio of zeolite beta:$Al_2O_3$:$P_2O_5$:$SiO_2$:$H_2O_2$:$H_2O$=1:(0.001-0.02):(0.01-0.30):(0-0.05):(0-0.10):(1.0-3.0), then drying and further rising the temperature to 400-650° C. and calcining the mixture thus obtained for 1-5 hrs, then exchanging the calcined zeolite with ammonium ion by using a conventional method to reduce the $Na_2O$ content of the zeolite to less than 0.1 wt %. This process can obviously improve the activity stability of the zeolite betas and the crystallization retention can be increased as well.

SUMMARY OF THE INVENTION

The inventors discover surprisingly that, when a zeolite bets is modified with phosphorus and transition metal(s), not only the hydrothermal stability of the zeolite beta can be increased, but also the yield and the selectivity of $C_2$~$C_{12}$ olefins (especially $C_5$~$C_{12}$ olefins) can be increased when the thus modified zeolite is used as an active component of a cracking catalyst or additive.

Therefore, one of objects of the present invention is to provide a modified zeolite beta. The second object of the present invention is to provide the use of the modified zeolite beta as an active component in catalytic cracking catalyst or additive.

The modified zeolite beta provided according to the present invention is a zeolite beta modified with phosphorus and transition metals, its anhydrous chemical formula, by weight % of the oxides, is (0-0.3)$Na_2O$.(0.5-10)$Al_2O_3$.(1.3-

10)$P_2O_5$.(0.7-15)$M_xO_y$.(70-97)$SiO_2$, wherein M is one or more transition metals selected from the group consisting of Fe, Co, Ni, Cu, Mn, Zn and Sn, x is the number of the atoms of said transition metal M, y is a number that meets with the requirement of the oxidation state of said transition metal M.

Further, the present invention provides the use of said modified zeolite beta as an active component of a cracking catalyst or additive.

Additional features of the invention will be set forth in the description which follows, and in part will be apparent from the description, or may be learned by practice of the invention.

PREFERRED EMBODIMENTS OF THE INVENTION

The invention is described more fully hereinafter. This invention may, however, be embodied in many different forms and should not be construed as limited to the embodiments set forth herein. Rather, these embodiments are provided so that this disclosure is thorough, and will fully convey the scope of the invention to those skilled in the art.

The modified zeolite beta provided according to the present invention is a zeolite beta modified with phosphorus and transition metals, its anhydrous chemical formula, by weight % of the oxides, is (0-0.3)$Na_2O$.(0.5-10)$Al_2O_3$.(1.3-10)$P_2O_5$.(0.7-15)$M_xO_y$.(70-97)$SiO_2$, wherein M is one or more transition metals selected from the group consisting of Fe, Co, Ni, Cu, Mn, Zn and Sn, x is the number of the atoms of said transition metal M, y is a number that meets with the requirement of the oxidation state of said transition metal M. In one embodiment, said transition metal M is one selected from the group consisting of Fe, Co, Ni, Cu, Mn, Sn and Sn.

Preferably, the modified zeolite beta according to the present invention has an anhydrous chemical formula, by weight % of the oxides, of (0-0.2)$Na_2O$.(1-9)$Al_2O_3$.(1.5-7)$P_2O_5$.(0.9-10)$M_xO_y$.(75-95)$SiO_2$, or more preferably, of (0-0.2)$Na_2O$.(1-9)$Al_2O_3$.(2-5)$P_2O_5$.(1-3)$M_xO_y$.(84-95)$SiO_2$.

In a preferred embodiment, said transition metal M is one or more selected from Fe, Co, Ni and Cu, more preferably Fe and/or Cu.

The preparation process of the modified zeolite beta of the invention comprises steps of: ammonium exchanging, modifying with phosphorus, modifying with metals and calcining. Specifically, the preparation process comprises for instance that: a Na type of zeolite beta, obtained by a conventional crystallization, for example, is exchanged in a weight-ratio of zeolite:ammonium salt:$H_2O$=1:(0.1-1):(5-10) at a temperature from room temperature to 100° C. for 0.5-2 hrs, and filtered, the exchange procedure can be repeated for 1-4 times to result in a $Na_2O$ content of the zeolite of less than 0.2 wt %, then phosphorus and one or more transition metals M selected from the group consisting of Fe, Co, Ni, Cu, Mn, Zn and Sn are introduced to modify the exchanged zeolite beta, then calcined at 400-800° C. for 0.5-8 hrs, wherein said calcining process can be a calcining process under a steam atmosphere.

In the process for preparing the modified zeolite beta of the present invention, the process for modifying zeolite with said phosphorus and one or more of transition metals M selected from Fe, Co, Ni, Cu, Mn, Zn and Sn can be carried out, for example, through an impregnation or ion-exchange method.

The impregnation can be effected, for instance, as one of the three ways:

a. An ammonium-exchanged zeolite beta filter cake is pulped homogeneously with a predetermined amount of an aqueous solution of a phosphorus-containing compound at a temperature from room temperature to 95° C., oven dried and calcined under a condition of 400-800° C., mixed homogeneously with a predetermined amount of an aqueous solution of a compound containing one or more transition metal(s) M selected from Fe, Co, Ni, Cu, Mn, Zn and Sn at a temperature from room temperature to 95° C., then oven dried;

b. An ammonium exchanged zeolite beta filter cake is pulped homogeneously with a predetermined amount of an aqueous solution of a phosphorus-containing compound at a temperature from room temperature to 95° C., oven dried, mixed homogeneously with a predetermined amount of an aqueous solution of a compound containing one or more transition metal(s) M selected from Fe, Co, Ni, Cu, Mn, Zn and Sn at a temperature from room temperature to 95° C., then oven dried, wherein the impregnation sequence of aforementioned two aqueous solutions can be also reversed; and c. An ammonium exchanged zeolite beta filter cake is mixed homogeneously with a predetermined amount of a mixed aqueous solution containing a phosphorus-containing compound and a compound containing one or more transition metal(s) M selected from Fe, Co, Ni, Cu, Mn, Zn and Sn at a temperature from room temperature to 95° C., then oven dried, Said ion exchange may be given for instance as the following method. The filter cake of zeolite beta after ammonium exchanged is pulped homogeneously with a predetermined amount of an aqueous solution of a phosphorus-containing compound at a temperature from room temperature to 95° C. and oven dried, calcined under a condition of 400-800° C., then mixed homogeneously with a predetermined amount of an aqueous solution of a compound containing one or more transition metal(s) M selected from Fe, Co, Ni, Cu, Mn, Zn and Sn in a solid/liquid ratio of 1:(5-20), stirred at 80-95° C. for 2-3 hrs, then filtered, the exchange step can be repeated many times, the sample thus obtained after exchanged is washed with water many times, then oven dried.

In the process for preparing the modified zeolite beta of the present invention, said ammonium salt is an inorganic one commonly used in the ammonium exchange treatment in the art, such as one selected from ammonium chloride, ammonium sulfate and ammonium nitrate, or their mixture.

In the process for preparing the modified zeolite beta of the present invention, said phosphorus-containing compound is one selected from phosphoric acid, ammonium hydrogen phosphate, ammonium dihydrogen phosphate and ammonium phosphate, or their mixture.

In the process for preparing the modified zeolite beta of the present invention, the zeolite beta used has no special limitation, which can be one commonly used in the art, also can be a commercial sold one, and also can be one obtained by using a known preparation process in the art.

In the process for preparing the modified zeolite beta of the present invention, said compound containing one or more transition metal(s) M selected from Fe, Co, Ni, Cu, Mn, Zn and Sn is selected from its corresponding water soluble salt, then said water soluble salt is one selected from a sulfate, a nitrate and a chloride.

In the preparation process of the present invention, the equipment and the process control involved in preparing the inventive modified zeolite beta have no special limitation and those that are conventional in the art may be used.

In another embodiment, the present invention provides the use of said modified zeolite beta as an active component of a cracking catalyst or additive. Using the inventive modified zeolite beta as an active component, cracking catalyst or additive can be produced for use in the catalytic cracking of petroleum hydrocarbons.

The cracking catalyst or additive can be prepared by conventional methods, provided that the modified zeolite beta of the present invention is used as its active component, hereon no more said is needed.

The modified zeolite beta of the invention can be used in the catalytic cracking process of petroleum hydrocarbons as an active component of a cracking catalyst or additive. The modified zeolite beta of the invention is one modified simultaneously with phosphorus and transition metal(s), not only the hydrothermal stability of the zeolite beta is increased, but also the selectivity of $C_2$~$C_{12}$ olefins (especially, $C_5$~$C_{12}$ olefins) can be increased obviously when the modified zeolite beta is used as an active component of a cracking catalyst or additive in catalytic cracking process.

Since $C_5$~$C_{12}$ olefins in gasoline prod-act are effective precursors to form $C_2$~$C_4$ olefins, increasing $C_5$~$C_{12}$ olefin content of gasoline can result in more olefin feedstock for a shape-selective zeolite to form $C_2$~$C_4$ olefins through a further shape selective cracking.

EXAMPLES

The following examples are used to illustrate further the present invention, without limiting the present invention.

In each example and comparative example, contents of $Na_2O$, $Fe_2O_3$, $Co_2O_3$, $NiO$, $CuO$, $Mn_2O_3$, $ZnO$, $SnO_2$, $Al_2O_3$ and $SiO_2$ in each sample of the modified zeolites beta are measured by X-ray fluorescence method (Seen also <<Analytical Methods in Petrochemical Industry (RIPP Experiment Techniques)>>, Ed. by Yang Cuiding et. al., Science Press, 1990).

Evaluation method of catalyst activity and characterization method of catalyst composition that are mentioned in the following examples and comparative examples are conventional in the art, therefore, all related illustration for these is omitted.

All reagents used as the following are chemically pure reagents, otherwise a special explanation is given.

Example 1

100 g (on dry basis) of a zeolite beta (produced by Qilu Catalyst Company, ratio of $SiO_2/Al_2O_3=25$) was exchanged and washed with a $NH_4Cl$ solution to a $Na_2O$ content of less than 0.2 wt %, filtering, to obtain a filter cake, 6.8 g $H_3PO_4$ (concentration of 85%) and 3.2 g $Cu(NO_3)_2.3H_2O$ were added to and dissolved in 90 g water, then mixed with the filter cake to effect impregnation, oven-dried, calcined at 550° C. for 2 hrs, then the modified zeolite-beta according to the present invention was obtained. Its chemical composition by elemental analysis is:

$0.1Na_2O.8.2Al_2O_3.4.0P_2O_5.1.0CuO.86.7SiO_2$.

Example 2

100 g (on dry basis) of a zeolite beta was exchanged and washed with a $NH_4Cl$ solution to a $Na_2O$ content of less than 0.2 wt %, filtering, to obtain a filter cake, 11.8 g $H_3PO_4$ (concentration of 85%) and 6.3 g $CuCl_2$ were added to and dissolved in 90 g water, then mixed with the filter cake to effect impregnation, oven-dried, calcined at 550° C. for 2 hrs, then the modified zeolite beta according to the present invention was obtained. Its chemical composition by elemental analysis is:

$0.1Na_2O.7.0Al_2O_3.6.9P_2O_5.3.5CuO.82.5SiO_2$.

Example 3

100 g (on dry basis) of a zeolite beta was exchanged and washed with a $NH_4Cl$ solution to a $Na_2O$ content of less than 0.2 wt %, filtering, to obtain a filter cake; 4.2 g $NH_4H_2PO_4$ was dissolved in 60 g water, then mixed with the filter cake to effect impregnation, oven-dried, calcined at 550° C. for 2 hrs; aforementioned sample was exchanged with a $Cu(NO_3)_2$ solution (concentration of 5%) in a solid:liquid ratio of 1:5 at 80-90° C. for 2 hrs, filtered, the exchange was conducted for several times till a predetermined amount was reached, then calcined at 550° C. for 2 hrs, that is zeolite provided according to the present invention. Its chemical composition by elemental analysis is:

$0.03Na_2O.2.0Al_2O_3.2.5P_2O_5.2.1CuO.93.4SiO_2$.

Example 4

100 g (on dry basis) of a zeolite beta was exchanged and washed with a $NH_4Cl$ solution to a $Na_2O$ content of less than 0.2 wt %, filtering, to obtain a filter cake, 6.9 g $H_{13}PO_4$ (concentration of 85%) and 8.1 g $Fe(NO_3)_3.9H_2O$ were added to and dissolved in 90 g water, then mixed with the filter cake to effect impregnation, then oven-dried; the obtained sample was calcined at 550° C. for 2 hrs, then the modified zeolite beta according to the present invention was obtained. Its chemical composition by elemental analysis is:

$0.1Na_2O.6.0Al_2O_3.4.1P_2O_5.1.5Fe_2O_3.88.3SiO_2$.

Example 5

100 g (on dry basis) of a zeolite beta was exchanged and washed with a $NH_4Cl$ solution to a $Na_2O$ content of less than 0.2 wt %, filtering, to obtain a filter cake, 9.3 g $H_3PO_4$ (concentration of 85%) and 33.6 g $Co(NO_3)_2.6H_2O$ were added to and dissolved in 90 g water, then mixed with the filter cake to effect impregnation, oven-dried, calcined at 550° C. for 2 hrs, then the modified zeolite beta according to the present invention was obtained. Its chemical composition by elemental analysis is:

$0.1Na_2O.6.7Al_2O_3.5.4P_2O_5.9.6Co_2O_3.78.2SiO_2$.

Example 6

100 g (on dry basis) of a zeolite beta was exchanged and washed with a $NH_4Cl$ solution to a $Na_2O$ content of less than 0.2 wt %, filtering, to obtain a filter cake, 6.0 g $H_3PO_4$ (concentration of 85%) and 6.3 g $Ni(NO_3)_2.6H_2O$ were added to and dissolved in 90 g water, then mixed with the filter cake to effect impregnation, then oven-dried; the obtained sample was calcined at 550° C. for 2 hrs, then the modified zeolite beta according to the present invention was obtained. Its chemical composition by elemental analysis is:

$0.08Na_2O.6.0Al_2O_3.4.3P_2O_5.1.8NiO.87.8SiO_2$.

Example 7

100 g (on dry basis) of a zeolite beta was exchanged and washed with a $NH_4Cl$ solution to a $Na_2O$ content of less than 0.2 wt %, filtering, to obtain a filter cake, 6.0 g $H_3PO_4$ (concentration of 85%) and 35.4 g $Mn(NO_3)_2$ were added to and dissolved in 90 g water, then mixed with the filter cake to effect impregnation, then oven-dried; the obtained sample was calcined at 550° C. for 2 hrs, then the modified zeolite beta according to the present invention was obtained. Its chemical composition by elemental analysis is:

$0.09Na_2O.1.9Al_2O_3.3.8P_2O_5.6.4Mn_2O_3.87.8SiO_2$.

Example 8

100 g (on dry basis) of a zeolite beta, as a crystallized product, was exchanged and washed with a $NH_4Cl$ solution to a $Na_2O$ content of less than 0.2 wt %, filtering, to obtain a filter cake, 2.1 g $H_3PO_4$ (concentration of 85%) and 5.9 g $Zn(NO_3)_2.6H_2O$ were added to and dissolved in 90 g water, then mixed with the filter cake to effect impregnation, then oven-dried; the obtained sample was calcined at 550° C. for 2 hrs, then the modified zeolite beta according to the present invention was obtained. Its chemical composition by elemental analysis is:

$$0.15Na_2O \cdot 1.3Al_2O_3 \cdot 1.5P_2O_5 \cdot 1.6ZnO \cdot 95.8SiO_2.$$

Example 9

100 g (on dry basis) of a zeolite beta was exchanged and washed with a NH$_4$Cl solution to a Na$_2$O content of less than 0.2 wt %, filtering, to obtain a filter cake, 6.0 g H$_3$PO$_4$ (concentration of 85%) and 3.7 g SnCl$_4$·5H$_2$O were added to and dissolved in 90 g water, then mixed with the filter cake to effect impregnation, then oven-dried; the obtained sample was calcined at 550° C. for 2 hrs, then the modified zeolite beta according to the present invention was obtained. Its chemical composition by elemental analysis is:

$$0.11Na_2O \cdot 6.3Al_2O_3 \cdot 4.1P_2O_5 \cdot 1.7SnO_2 \cdot 87.8SiO_2.$$

Example 10

100 g (on dry basis) of a zeolite beta was exchanged and washed with a NH$_4$Cl solution to a Na$_2$O content of less than 0.2 wt %, filtering, to obtain a filter cake, 7.1 g H$_3$PO$_4$ (concentration of 85%), 3.2 g Cu(NO$_3$)$_2$·3H$_2$O and 5.3 g Fe(NO$_3$)$_3$·9H$_2$O were added to and dissolved in 90 g water, then mixed with the filter cake to effect impregnation, then oven-dried; the obtained sample was calcined at 550° C. for 2 hrs, then the modified zeolite beta according to the present invention was obtained. Its chemical composition by elemental analysis is:

$$0.11Na_2O \cdot 5.9Al_2O_3 \cdot 4.1P_2O_5 \cdot 1.0CuO \cdot 1.0Fe_2O_3 \cdot 87.9SiO_2,$$

or $$0.11Na_2O \cdot 5.9Al_2O_3 \cdot 4.1P_2O_5 \cdot 2.0MO_{1.25} \cdot 87.9SiO_2,$$

wherein the calculated atomic weight of the transition metal M is 59.7.

Comparative Example 1

The zeolite beta was exchanged and washed with a NH$_4$Cl solution to a Na$_2$O content of less than 0.2 wt %, filtering, to obtain a filter cake, the filter cake was oven-dried at 120° C.; the obtained sample was calcined at 550° C. for 2 hrs. Its chemical composition by elemental analysis is:

$$0.15Na_2O \cdot 6.4Al_2O_3 \cdot 93.5SiO_2.$$

Comparative Example 2

The comparative example is used to illuminate a phosphorus-modified zeolite beta (prepared according to the method used in CN 1179994A).

100 g (on dry basis) of a zeolite beta was exchanged and washed with a NH$_4$Cl solution to a Na$_2$O content of less than 0.2 wt %, filtering, to obtain a filter cake; the filter cake was reacted at 60° C. with 500 ml of 3 wt % hydrofluosilicic acid (H$_2$SiF$_6$) solution for 2 hrs, filtered, then the filtered filter cake was mixed homogeneously with a mixture consisting of 8 g phosphoric acid having a concentration of 85 wt % and 2 g pseudo-boehmite (on dry basis), the resultant mixture was dried at 110° C. in an oven, put into a Muffle furnace and calcined at 550° C. under a steam flow of a WHSV of 2 hr$^{-1}$ for 2 hrs. By elemental analysis, the chemical composition of the obtained product is:

$$0.1Na_2O \cdot 5.1Al_2O_3 \cdot 3.3P_2O_5 \cdot 91.5SiO_2.$$

Comparative Example 3

The comparative example is used to illuminate the metal-modified zeolite beta.

100 g (on dry basis) of a zeolite beta, as a crystallized product, was exchanged and washed with a NH$_4$Cl solution to a Na$_2$O content of less than 0.2 wt %, filtering, to obtain a filter cake, 4.7 g Cu(NO$_3$)$_2$·3H$_2$O was added to and dissolved in 90 g water, then mixed with the filter cake to effect impregnation, then oven-dried; the obtained sample was calcined at 550° C. for 2 hrs. Its chemical composition by elemental analysis is:

$$0.1Na_2O \cdot 6.3Al_2O_3 \cdot 1.5CuO \cdot 92.1SiO_2.$$

Example 11

The present example is used to illuminate the effect of the modified zeolite beta of the invention on the C$_2$~C$_{12}$ olefins (especially C$_5$~C$_{12}$ olefin) yield and selectivity when it is used in the catalytic cracking of a light diesel oil.

The samples prepared in aforementioned examples and comparative examples are aged respectively in a fixed-bed aging apparatus under a condition of 800° C. and 100% steam for 4 hrs, tabletted and screened, then particles of 20-40 mesh were evaluated in a fixed-bed microreactor for catalytic cracking using a light diesel oil as a feedstock oil under a evaluation condition of: reaction temperature of 550° C., regeneration temperature of 600° C., oil feeding of 1.56 g, feeding time of 70 seconds, and catalyst inventory of 2 g.

It can be seen from the Tables that the modified zeolite provided in the present invention has not only excellent hydrothermal stability, but also higher C$_2$~C$_{12}$ olefins (especially C$_5$~Cl$_{12}$ olefins) yield and selectivity. Modification of zeolite beta with phosphorus (see the Comparative Example 2) can increase the hydrothermal stability and the hydrocarbon conversion capacity of the zeolite beta effectively. Modification of zeolite beta with transition metals (see the Comparative Example 3), in light of the moderate dehydrogenation ability of the metals, the selectivity of olefins in a hydrocarbon cracking process is increased effectively. As comparison, the modified zeolite beta of the invention is one modified simultaneously with phosphorus and transition metal(s), the hydrothermal stability of the zeolite beta is increased, C$_2$~C$_{12}$ olefins (especially C$_5$~C$_{12}$ olefins) yield and selectivity in the cracked products are effectively increased as well, with the propylene yield increased to a greater extent.

Furthermore, C$_5$~C$_{12}$ olefins yield is increased obviously. It is known that C$_5$~C$_{12}$ olefins are effective precursors for forming C$_2$~C$_4$ olefins. Increment in C$_5$~C$_{12}$ olefins yield can result in more feedstock for a shape-selective zeolite to form C$_2$~C$_4$ olefins through a further shape selective cracking.

Example 12

The present example is used to illuminate the effect of the modified zeolite beta of the invention on the yield and the selectivity of C$_2$~C$_4$ olefins when it is used as one of the active components in a catalyst for catalytic cracking petroleum hydrocarbons.

The modified zeolite beta samples prepared in aforementioned examples and comparative examples were aged respectively in a fixed-bed aging apparatus at a condition of 800° C. and 100% steam for 4 hrs, then mixed homogeneously with an industrial equilibrium catalyst DOCP (produced by Changling Catalyst Company) and a shape is selective molecular sieve in a ratio of DOCP:the modified zeolite beta:the shape selective molecular sieve=85:5:10 to obtain a catalyst.

A comparative catalyst CAT-0 was obtained by mixing homogeneously an industrial equilibrium catalyst DOCP and a shape selective molecular sieve in a ratio of DOCP: the shape selective molecular sieve=90:10. The catalysts were evaluated on a fixed-bed microreactor for catalytic cracking under conditions of: reaction temperature of 500° C., regeneration temperature of 600° C., catalyst-oil ratio of 2.94 and catalyst inventory of 5 g.

Properties of feedstock oil are shown in Table 2. Results of the evaluation are shown in Table 3.

It can be seen from Table 3 that, in comparison with CAT-0 without a zeolite beta, when a zeolite beta is added in a catalytic cracking catalyst (Comparative Example 1), conversion of the heavy oil decreases and the propylene yield increases slightly. When a phosphorus-modified zeolite beta is added (Comparative Example 2), conversion of the heavy oil is comparable, however, the propylene yield increases. When a metal-modified zeolite beta is added (Comparative Example 3), the propylene yield increases, but conversion of the heavy oil is lowered. As a comparison, when the modified zeolite beta of the invention is added, conversion of the heavy oil is substantially comparable, the coke and dry gas yield increases slightly, while the propylene yield increases, the total butene yield and the isobutene yield increase to an extent, liquefied petroleum gas yield increases, and the propylene concentration in the liquefied petroleum gas increases as well.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

TABLE 2

| item | Analytical data |
| --- | --- |
| Density(20° C.) g/cm$^3$ | 0.8731 |
| Refractivity(70° C.) | 1.4682 |
| Viscosity(80° C.) mm$^2$/s | 17.56 |
| Vacuum distillation range ° C. | |
| Initial boiling point | 189 |
| 5% | 398 |
| 10% | 418 |
| 30% | 457 |
| 50% | 497 |
| 70% | 549 |
| 90% | 73.5%, 560° C. |
| Acid number mgKOH/g | 0.07 |
| Carbon residue % | 0.7 |
| Ash % | 0.05 |
| S content % | 0.12 |
| N content % | 0.11 |
| C, H content % | |
| C | 86.43 |
| H | 13.53 |

TABLE 1

| No. of Examples | 1 | 2 | 3 | 4 | 5 | 6 | 7 | 8 | 9 | 10 | Comparative Ex. 1 | Comparative Ex. 2 | Comparative Ex. 3 |
| --- | --- | --- | --- | --- | --- | --- | --- | --- | --- | --- | --- | --- | --- |
| Conversion, m % | 67.51 | 66.50 | 66.04 | 66.03 | 65.77 | 65.63 | 65.98 | 65.49 | 66.02 | 66.92 | 57.40 | 64.03 | 56.30 |
| mass balance, m % | | | | | | | | | | | | | |
| dry gas | 1.64 | 1.63 | 1.63 | 1.63 | 1.63 | 1.63 | 1.63 | 1.63 | 1.63 | 1.64 | 1.57 | 1.60 | 1.62 |
| liquefied petroleum gas | 26.88 | 26.18 | 25.87 | 25.86 | 25.68 | 25.58 | 25.82 | 25.49 | 25.75 | 26.47 | 19.92 | 21.35 | 21.15 |
| gasoline | 37.86 | 37.63 | 37.53 | 37.52 | 37.46 | 37.43 | 37.51 | 37.40 | 37.49 | 37.74 | 35.56 | 40.23 | 32.72 |
| diesel oil | 32.49 | 33.50 | 33.96 | 33.97 | 34.23 | 34.37 | 34.03 | 34.51 | 34.13 | 33.08 | 42.60 | 35.97 | 43.70 |
| coke | 1.11 | 1.04 | 1.00 | 1.00 | 0.98 | 0.97 | 1.00 | 0.96 | 0.99 | 1.07 | 0.34 | 0.85 | 0.81 |
| ethylene, m % | 0.92 | 0.89 | 0.90 | 0.88 | 0.87 | 0.86 | 0.88 | 0.87 | 0.90 | 0.90 | 0.78 | 0.80 | 0.83 |
| propylene, m % | 10.21 | 9.90 | 9.77 | 9.76 | 9.68 | 9.64 | 9.75 | 9.60 | 9.71 | 10.03 | 7.17 | 7.52 | 7.98 |
| butene, m % | 8.85 | 8.62 | 8.59 | 8.58 | 8.54 | 8.55 | 8.70 | 8.49 | 8.67 | 8.74 | 7.59 | 7.63 | 7.81 |
| $C_5^=$~$C_{12}^=$, m % | 21.74 | 21.16 | 20.90 | 20.89 | 20.74 | 20.67 | 20.86 | 20.59 | 20.81 | 21.41 | 16.22 | 17.63 | 18.44 |
| propylene concentration in liquefied petroleum gas, m % | 37.98 | 37.78 | 37.69 | 37.69 | 37.64 | 37.61 | 37.68 | 37.58 | 37.66 | 37.89 | 35.99 | 35.22 | 37.71 |
| propylene/propane | 6.60 | 6.59 | 6.59 | 6.59 | 6.59 | 6.59 | 6.59 | 6.58 | 6.59 | 6.60 | 6.52 | 6.45 | 6.61 |
| composition of gasoline (PONA), m % | | | | | | | | | | | | | |
| normal alkanes | 9.10 | 9.14 | 9.15 | 9.15 | 9.16 | 9.17 | 9.16 | 9.17 | 9.16 | 9.12 | 9.47 | 9.5 | 9.32 |
| isomeric alkanes | 15.26 | 15.88 | 16.16 | 16.17 | 16.33 | 16.42 | 16.21 | 16.51 | 16.27 | 15.65 | 21.49 | 21.3 | 15.66 |
| Cycloalkanes | 4.18 | 4.19 | 4.20 | 4.20 | 4.20 | 4.21 | 4.20 | 4.21 | 4.20 | 4.19 | 4.32 | 4.36 | 4.15 |
| olefins* | 57.41 | 56.23 | 55.70 | 55.68 | 55.37 | 55.21 | 55.62 | 55.05 | 55.50 | 56.73 | 45.61 | 43.83 | 56.35 |
| aromatic hydrocarbons | 14.05 | 14.56 | 14.78 | 14.79 | 14.92 | 14.99 | 14.82 | 15.06 | 14.87 | 14.31 | 19.11 | 21.01 | 14.52 |

*Note:

referring to $C_5$~$C_{12}$ olefins in gasoline.

TABLE 3

| No. of Examples | 1 | 2 | 3 | 4 | 5 | 6 | 7 | 8 | 9 | 10 | Comparative Ex. 1 | Comparative Ex. 2 | Comparative Ex. 3 | CAT-0 |
|---|---|---|---|---|---|---|---|---|---|---|---|---|---|---|
| mass balance, m % | | | | | | | | | | | | | | |
| dry gas | 2.44 | 2.39 | 2.41 | 2.38 | 2.27 | 2.37 | 2.24 | 2.33 | 2.21 | 2.41 | 1.98 | 2.01 | 2.03 | 2.17 |
| liquefied petroleum gas | 32.67 | 32.51 | 32.57 | 32.47 | 32.07 | 32.42 | 31.96 | 32.28 | 31.85 | 32.61 | 30.10 | 30.56 | 31.23 | 29.84 |
| gasoline | 38.57 | 38.71 | 38.66 | 38.74 | 39.09 | 38.78 | 39.18 | 38.90 | 39.28 | 38.59 | 39.06 | 41.05 | 38.29 | 42.13 |
| diesel oil | 11.68 | 11.66 | 11.67 | 11.66 | 11.61 | 11.65 | 11.59 | 11.63 | 11.58 | 11.65 | 13.45 | 12.05 | 12.45 | 12.54 |
| heavy oil | 10.02 | 10.12 | 10.08 | 10.14 | 10.39 | 10.17 | 10.45 | 10.26 | 10.52 | 10.13 | 11.40 | 9.98 | 11.93 | 8.69 |
| coke | 4.62 | 4.61 | 4.61 | 4.61 | 4.58 | 4.60 | 4.57 | 4.59 | 4.56 | 4.61 | 4.01 | 4.35 | 4.07 | 4.64 |
| conversion, m % | 78.31 | 78.22 | 78.25 | 78.20 | 78.01 | 78.18 | 77.96 | 78.11 | 77.90 | 78.22 | 75.15 | 77.97 | 75.62 | 78.77 |
| ethylene, m % | 1.35 | 1.29 | 1.31 | 1.30 | 1.28 | 1.31 | 1.26 | 1.28 | 1.25 | 1.27 | 1.20 | 1.21 | 1.24 | 1.15 |
| propylene, m % | 10.37 | 10.30 | 10.33 | 10.28 | 10.11 | 10.27 | 10.07 | 10.21 | 10.02 | 10.30 | 9.45 | 9.68 | 9.89 | 9.39 |
| total butene, m % | 9.44 | 9.41 | 9.42 | 9.41 | 9.34 | 9.40 | 9.33 | 9.38 | 9.31 | 9.42 | 8.98 | 9.02 | 9.13 | 8.49 |
| isobutene, m % | 3.57 | 3.55 | 3.56 | 3.54 | 3.48 | 3.53 | 3.47 | 3.51 | 3.45 | 3.55 | 3.12 | 3.31 | 3.42 | 3.08 |
| propylene concentration in liquefied petroleum gas, m % | 31.74 | 31.69 | 31.71 | 31.67 | 31.54 | 31.66 | 31.50 | 31.61 | 31.46 | 31.59 | 31.40 | 31.68 | 31.67 | 31.47 |

The invention claimed is:

1. A modified zeolite beta, characterized in that it is a zeolite beta modified with phosphorus and transition metal(s) M, having an anhydrous chemical formula by weight % of the oxides, of $(0-0.3)Na_2O.(0.5-10)Al_2O_3.(1.3-10)P_2O_5.(0.7-15)M_xO_y.(70-97)SiO_2$, wherein said transition metal M is one or more selected from the group consisting of Fe, Co, Ni, Cu, Mn, Zn and Sn, x is the number of the atoms of said transition metal M, and y is a number that meets with the requirement of the oxidation state of said transition metal M.

2. The modified zeolite beta according to claim 1, having an anhydrous chemical formula of $(0-0.2)Na_2O.(1-9)Al_2O_3.(1.5-7)P_2O_5.(0.9-10)M_xO_y.(75-95)SiO_2$.

3. The modified zeolite beta according to claim 2, having an anhydrous chemical formula of $(0-0.2)Na_2O.(1-9)Al_2O_3.(2-5)P_2O_5.(1-3)M_xO_y.(84-95)SiO_2$.

4. The modified zeolite beta according to claim 1, wherein said transition metal M is one or more selected from the group consisting of Fe, Co, Ni and Cu.

5. The modified zeolite beta according to claim 1, wherein said transition metal M is selected from Fe and/or Cu.

6. A method of catalytically cracking a hydrocarbon stream, comprising treating the stream with a modified zeolite beta according to claim 1 as an active component in a cracking catalyst or additive.

7. A method according to claim 6, wherein the modified zeolite beta has an anhydrous chemical formula of $(0-0.2)Na_2O.(1-9)Al_2O_3.(1.5-7)P_2O_5.(0.9-10)M_xO_y.(75-95)SiO_2$.

8. A method according to claim 7, wherein the modified zeolite beta has an anhydrous chemical formula of $(0-0.2)Na_2O.(1-9)Al_2O_3.(2-5)P_2O_5.(1-3)M_xO_y.(84-95)SiO_2$.

9. A method according to claim 6, wherein said transition metal M is one or more selected from the group consisting of Fe, Co, Ni and Cu.

10. A method according to claim 6, wherein said transition metal M is selected from Fe and/or Cu.

* * * * *